I. C. Groom,
Potato Digger.

No. 92,304. Patented July 6. 1869.

Witnesses
James A. Buckbee
Alex. Selkirk

Inventor
Isaac. C. Groom

United States Patent Office.

ISAAC C. GROOM OF ALBANY, NEW YORK.

Letters Patent No. 92,304, dated July 6, 1869.

IMPROVEMENT IN POTATO-DIGGER.

The Schedule referred to in these Letters Patent and making part of the same.

*To all whom it may concern:*

Be it known that I, ISAAC C. GROOM, of the city and county of Albany, State of New York, have invented certain new and useful Improvements in Potato-Diggers; and I do hereby declare that the following is a full, clear, and exact description thereof, reference being had to the accompanying drawings, forming a part of this specification, in which—

The nature of my invention consists in an endless digging-device, carried by two drums, one placed above and the other below, near the ground to be dug. A rotating motion is given to the upper drum, by means of a pair of gears attached to the shaft of the said drum, and actuated by driving-gears attached to the main wheels, which support and carry the machine.

Placed back of the upper drum is a vibrating sieve, actuated by a crank or elbow-lever and connecting-rods, and operated by a pinion, driven by one of the gears on the drum-shaft. When the potatoes are dug and raised up over the top of the upper drum, they fall, with the soil carried with them, into the said sieve, and are there separated. A basket or box, pivoted to the sides of the frame of the machine, is placed beneath the said sieve, and catches the potatoes as they fall therefrom, and when the said box is filled, it is dumped, by means of a suitable rod, by the driver in front. By a pair of levers, the driver can throw the gears in or out of action, as may be required. A seat is also provided for the driver, who can from his place operate and control each part required.

The front of the machine is supported and carried by a pair of wheels, supporting an elliptic spring, which may be depressed at will, so as to cause the digging-tines to enter deeper into the ground. This is effected by means of a lever, so placed as to be readily operated by the driver.

To enable others skilled in the art to make and use my invention, I will proceed to describe, in reference to the accompanying drawings, and the letters of reference marked thereon, the same letters indicating like parts.

A represents the frame of the machine.

B is the main, or driving-wheels.

D is the front platform.

Figure 1:
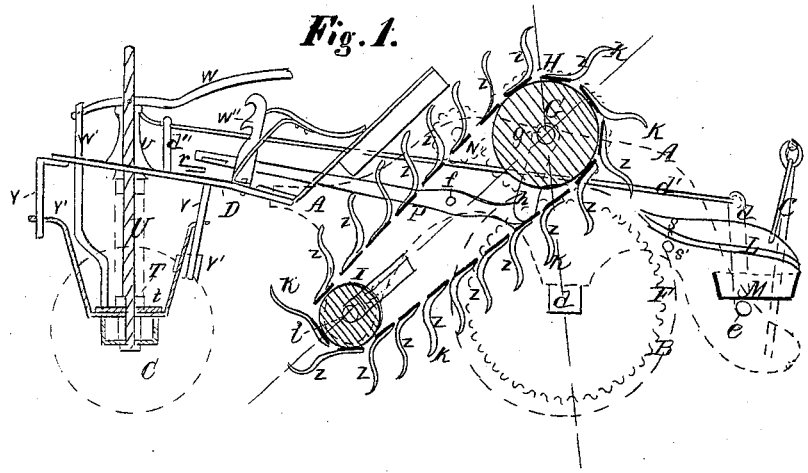
Figure 1 represents a longitudinal vertical section of the machine.
Figure 2:
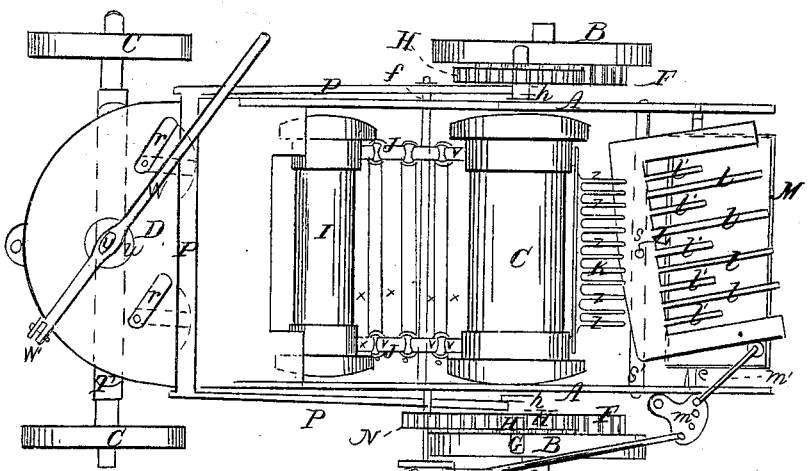
Figure 2 represents a perspective vertical view, with a part of the endless digging-forks removed.
Figure 3:
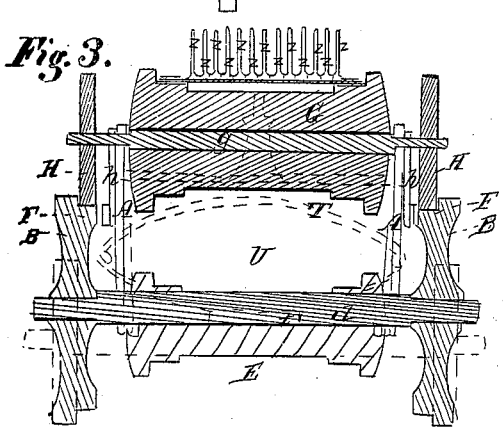
Figure 3 is a lateral cross-section through red line, fig. 1.

The drive-wheels B are provided with the drive-gears F, figs. 1, 2, and 3, and run on an axle, *a*, secured in any suitable manner to the frame A, as shown in figs. 1 and 3.

A drum, G, figs. 1, 2, and 3, provided with the shaft *g*, is placed above the frame, and over and a little in front of the axle *a*. The shaft *g* of the said drum works into the boxes or bearings, which are free to work in a lateral direction in their seats in the frame. The said shaft *g* also is made to project beyond the frame A, and receives the gears H. The said gears H work in, and are rotated by the drive-gears F, attached to the drive-wheels B, as shown in figs. 1 and 3.

A second and smaller drum, I, is placed forward, and nigh the ground, and revolves on a shaft, *i*, running into proper bearings, shown in red lines, fig. 1.

The drums G and I carry the endless link-band J, which is kept tight by the set-screw and the upper bearing of the shaft *i*, of the lower drum I, shown by the red lines in fig. 1.

Attached to and carried by the said endless bands J, are the digging-forks K'. The said forks are made by riveting to the bars *x* of metal, the tines *z*, as shown in figs. 1, 2, 3, and 4. The tines *z* are made of steel, and are slightly S-shaped, as shown in fig. 1.

Figure 4:
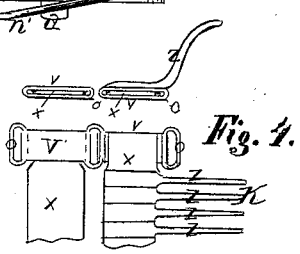
Figure 4 shows the manner of the construction of the endless belts, carrying the digging-tines.

The endless bands J are formed by the flat metal links *v*, and the oblong round iron links *o*, fig. 4.

Placed back of the drum G, and below a line with its lower surface, is a vibrating sieve, L, consisting of several long bars *l* and short bars *l'*, fig. 2, placed and secured alternate to a common head. The said sieve is hung from two standards *c*, starting up from the frame on either side, and works on a pivot, *s*, starting up from the bar *s'*, figs. 1 and 2, and is vibrated by means of a bell-crank, *m*, and connecting-rods *m'*, which are operated by a crank, *n*, and rod *n'*. The crank *n* is attached to the shaft of the pinions N, which is rotated by its teeth working into the gear H, on the drum-shaft *g*.

Placed below the said vibrating sieve L is the receiving-basket or box M. The said receiving-box is supported on a bar, *e*, placed back of the centre of the said box, and beneath, and is furnished with journals at their ends, which work into bearings made in the sides of the frame A.

A standard, *d*, is secured to one end of the box L, and is provided with a rod, *d'*, which runs forward, and may be secured at the front standard *d''*, fig. 1, when the basket is to be kept in an upright position to catch the potatoes as they fall from the sieve above, and when the rod *d'* is removed from the said front standard *d''*, the basket will, of its own gravity, tilt back and empty its contents on the ground.

Two levers P, placed on either side of the frame A, work on pivots *f*, figs. 1 and 2. To the rear ends of the said levers are connected two connecting-links *h*, which links are attached to the shaft *g* of the drum G. When the long front ends of the said levers are thrown down, the rear ends of the same are thrown up and crowded upwards, the connecting-links *h* throw the gear H of the drum out from contact with the drive-gear G. By the bar *p'*, figs. 1 and 2, connecting the two levers in front, the said levers can be held down and secured by means of the buttons $r$, pivoted on the front platform, as shown in fig. 2.

The front part of the machine is carried by a pair of wheels, C, connected by an axle. The said axle can turn under the fifth-wheel $t$, figs. 1 and 3. Placed on the said fifth-wheel, and secured thereto, is the elliptic spring T, which supports the front of the machine.

A stiff rod, U, with its lower end acting as a king-bolt, passes through both sides of the spring, and up through the platform D, as shown in figs. 2 and 3, and is surrounded above the platform by a tubular standard, $u$. A lever, $w$, with one end pivoted to the standard $w'$, (starting from and secured to the fifth-wheel $t$,) straddles the rod $u$, and when the long end of the said ever $w$ is pressed down and secured by the hook or, clatch $w''$, the said end of the machine will be depressed and by this depression the digging-tines $z$ are carried down, so as to be in digging-position. Proper steadiments $y$ and $y$ are placed front, back of the rod U, shown in fig. 1, and work in proper supports Y' Y'.

When the machine is to be transported from place to place, the lever W is released from the catch W'', and the front of the machine is raised up by the spring T, which elevates the digging-tines from the ground.

The side-levers P are pressed down, and secured by the buttons $r$, which throw the gear on the drum-shaft out of action with the gear of the drive-wheel. Thus, with the two levers W and P, the operation of the digging and separating-apparatus is stopped.

When the machine is placed in position for operation in the field, the lever P is released from its buttons $r$, when the gear H will fall into contact with drive-gear F. The lever W is depressed and secured by the catch W'', which will cause the front to be depressed, and carry with it the digging-tines close to the surface of the ground.

Having described my invention,

What I claim, and desire to secure by Letters Patent, is—

1. The endless band of digging-forks, consisting of the tines $z$, bar $x$, flat metal links V, oblong links O, arranged substantially as and for the purpose set forth.

2. The vibrating sieve L, in combination with the receiving-basket M, substantially as and for the purpose set forth.

3. The lever W, rod U, spring T, standard W', catch W'', in combination with the main frame D and the front axle Q, substantially as and for the purpose set forth.

4. The levers P, pivots $f$, connecting-links $h$, and buttons $r$, in combination with the shaft $g$, substantially as and for the purpose set forth.

ISAAC C. GROOM.

Witnesses:
JAMES A. BUCKBEE, Jr.,
ALEX. SELKIRK.